United States Patent
Liao et al.

(10) Patent No.: US 11,575,290 B2
(45) Date of Patent: Feb. 7, 2023

(54) MOTOR STATOR WITH TOOTH CREST AIR GAP, MOTOR AND BUS

(71) Applicant: Gree Electric Appliances, Inc. of Zhuhai, Guangdong (CN)

(72) Inventors: Keliang Liao, Guangdong (CN); Tong Tong, Guangdong (CN); Suhua Lu, Guangdong (CN); Bin Chen, Guangdong (CN)

(73) Assignee: Gree Electric Appliances, Inc. of Zhuhai, Guangdong (CN)

( * ) Notice: Subject to any disclaimer, the term of this patent is extended or adjusted under 35 U.S.C. 154(b) by 71 days.

(21) Appl. No.: 17/054,799

(22) PCT Filed: Jan. 7, 2019

(86) PCT No.: PCT/CN2019/070659
§ 371 (c)(1),
(2) Date: Nov. 12, 2020

(87) PCT Pub. No.: WO2020/057018
PCT Pub. Date: Mar. 26, 2020

(65) Prior Publication Data
US 2021/0242742 A1 Aug. 5, 2021

(30) Foreign Application Priority Data
Sep. 19, 2018 (CN) .......................... 201811090914.6

(51) Int. Cl.
*H02K 3/487* (2006.01)
*H02K 1/16* (2006.01)
*H02K 21/22* (2006.01)

(52) U.S. Cl.
CPC ............. *H02K 3/487* (2013.01); *H02K 1/165* (2013.01); *H02K 21/22* (2013.01); *H02K 2213/03* (2013.01)

(58) Field of Classification Search
CPC .... H02K 3/487; H02K 3/493; H02K 2213/03; H02K 2201/03; H02K 1/165; H02K 1/08; H02K 1/18; H02K 21/22
(Continued)

(56) References Cited

U.S. PATENT DOCUMENTS

| 6,091,168 A | 7/2000 | Halsey et al. |
| 2011/0095643 A1* | 4/2011 | Laloy ................ H02K 1/24 310/216.132 |

(Continued)

FOREIGN PATENT DOCUMENTS

| CN | 103026584 A | 4/2013 |
| CN | 202978459 U | 6/2013 |

(Continued)

OTHER PUBLICATIONS

Machine translation of DE-102010038764-A1. (Year: 2012).*

*Primary Examiner* — Michael Andrews
(74) *Attorney, Agent, or Firm* — The Webb Law Firm (57) ABSTRACT

The present disclosure provides a motor stator, a motor and a bus. The motor stator includes a stator tooth. The stator tooth includes a tooth root and a tooth crest. The tooth crest is provided on the tooth root. The tooth crest includes a first tooth crest part and a second tooth crest part. The first tooth crest part and the second tooth crest part are provided on two sides of the tooth root along the circumference of the motor stator, respectively, and a tooth crest air gap is formed between the first tooth crest part and the second tooth crest part. According to the present disclosure, the motor stator is adapt to reduce magnetic flux leakage, and enhance the utilization rate of a permanent magnet and output torque.

12 Claims, 8 Drawing Sheets

(58) Field of Classification Search
USPC ........... 310/214, 216.074, 216.088, 216.094, 310/216.098, 216.099, 216.103
See application file for complete search history.

(56) References Cited

U.S. PATENT DOCUMENTS

| | | | |
|---|---|---|---|
| 2011/0101818 A1* | 5/2011 | Lokhandwalla | H02K 1/148 |
| | | | 310/216.098 |
| 2012/0098376 A1* | 4/2012 | Ombach | H02K 21/14 |
| | | | 310/156.01 |
| 2013/0076196 A1* | 3/2013 | Oh | H02K 21/222 |
| | | | 310/216.106 |
| 2013/0154436 A1* | 6/2013 | Nakano | B62D 5/046 |
| | | | 310/216.094 |

FOREIGN PATENT DOCUMENTS

| | | | | |
|---|---|---|---|---|
| CN | 203225602 U | 10/2013 | | |
| CN | 104600879 A | 5/2015 | | |
| CN | 204721115 U | 10/2015 | | |
| CN | 105322669 A | 2/2016 | | |
| CN | 109120080 A | 1/2019 | | |
| DE | 102010002696 A1 | 3/2011 | | |
| DE | 102010038764 A1 * | 2/2012 | ............... | H02K 1/08 |
| DE | 102010038764 A1 | 2/2012 | | |
| DE | 202016102217 U1 | 9/2016 | | |
| DE | 102016220823 A1 | 4/2018 | | |

* cited by examiner

MOTOR STATOR WITH TOOTH CREST AIR GAP, MOTOR AND BUS

CROSS-REFERENCE TO RELATED APPLICATIONS

This application is the United States national phase of International Application No. PCT/CN2019/070659 filed Jan. 7, 2019, and claims priority to Chinese Patent Application No. 201811090914.6 filed Sep. 19, 2018, the disclosures of which are hereby incorporated by reference in their entirety.

BACKGROUND OF THE INVENTION

Field of the Invention

The present disclosure relates to the technical field of motors, and in particular to a motor stator, a motor and a bus.

Description of Related Art

Low-speed, high-torque motors apply to various occasions, for example, electric vehicles, high-speed trains, elevators, mines and the like. Usually, such motors have a large number of poles, and corresponding a number of stator slots increased exponentially, causing difficulties of processing and craft. A near-polar-slot permanent magnet synchronous motor is an ideal low-speed, large-torque motor, because the number of its stator slots is close to the number of the rotor poles. Therefore, the near-polar-slot permanent magnet synchronous motor is adapted to resolve the foregoing problem.

Figure 1:
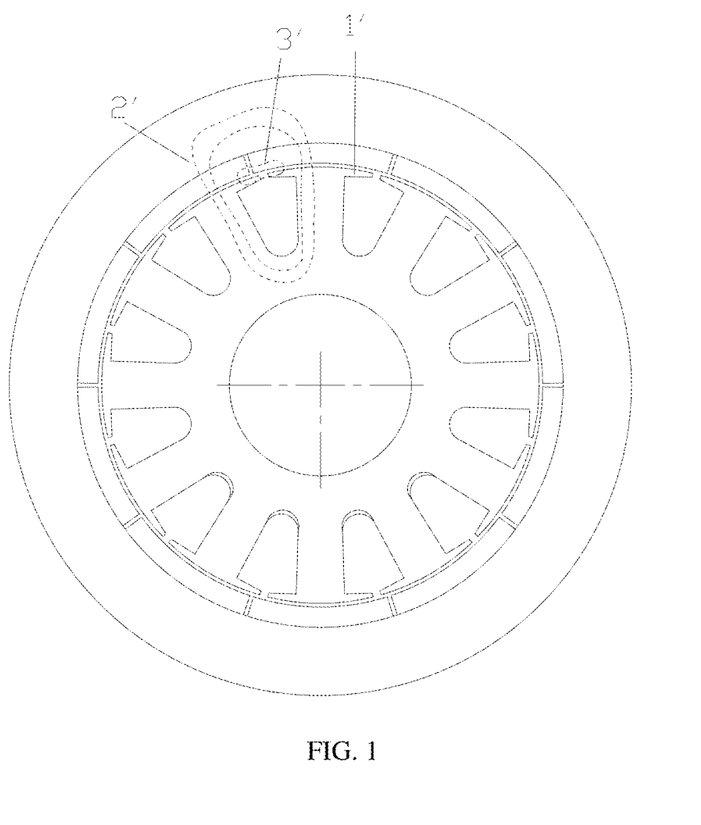
FIG. 1 is a schematic view of a magnetic flux path of a near-polar-slot permanent magnet synchronous motor in related art.

As shown in FIG. 1, a tooth crest 1' of a stator of a near-polar-slot permanent magnet synchronous motor is relatively wider, approaching the length of the polar arc of a rotor. As a result, a considerable part of the flux linkages generated by the permanent magnet directly close when passing the tooth crest 1' of the stator, and passes the magnetic flux leakage path 3' only, but does not pass the main magnetic flux path 2'. The part of the flux linkages will not generate effective torque, and therefore reduces the utilization rate of the permanent magnet. Magnetic flux leakage at the tooth crest of the stator further enables the tooth crest of the stator to become saturated in an early stage, further weakening the torque output of the motor. At the same time, since the saturation degree of each tooth is different, torque pulsation also increases.

Therefore, for the near-polar-slot permanent magnet synchronous motor in related art, the magnetic flux leakage at the tooth crest is caused by the tooth crest of the stator closing to the polar arc of the rotor, the magnetic flux leakage of the magnetic field at the tooth crest of the stator just closes when passing the tooth crest, and does not pass the yoke portion Magnetic flux leakage at the tooth crest resulting in side effects such as a low utilization rate to the permanent magnet, early saturation to the tooth crest of the motor and large torque pulsation.

SUMMARY OF THE INVENTION

The technical problem to be resolved by the present disclosure is to provide a motor stator, a motor and a bus, which can reduce magnetic flux leakage, and enhance the utilization rate of a permanent magnet and output torque.

To resolve the foregoing problem, the present disclosure provides a motor stator, including a stator tooth, wherein the stator tooth includes a tooth root and a tooth crest; the tooth crest is provided on the tooth root; the tooth crest includes a first tooth crest part and a second tooth crest part; the first tooth crest part and the second tooth crest part are provided on two sides of the tooth root along the circumference of the motor stator, respectively, and a tooth crest air gap is formed between the first tooth crest part and the second tooth crest part.

In some embodiments, the tooth crest air gap radially penetrates through the first tooth crest part and the second tooth crest part, and separates the first tooth crest part from the second tooth crest part.

In some embodiments, the tooth crest air gap radially extends from ends, close to the tooth root, of the first tooth crest part and the second tooth crest part, and the first tooth crest part and the second tooth crest part abut at ends away from the tooth root, so as to close the tooth crest air gap.

In some embodiments, the first tooth crest part and the second tooth crest part are integrally molded.

In some embodiments, the first tooth crest part of the stator tooth abuts the second tooth crest part of an adjoining stator tooth to form a closed slot.

In some embodiments the first tooth crest part of the stator tooth and the second tooth crest part of the adjoining stator tooth are integrally molded.

In some embodiments, the first tooth crest part and the second tooth crest part are in a clamped fixation with the tooth root.

In some embodiments, the tooth root is provided with a first clamping slot which extends along an axis direction of the motor stator, and the first tooth crest part is clamped in the first clamping slot; and/or, the tooth root is provided with a second clamping slot which extends along the axis direction of the motor stator, and the second tooth crest part is clamped in the second clamping slot.

In some embodiments, the cross section of the first clamping slot and/or the second clamping slot is trapezoidal, ±-shaped or major arc shaped.

In some embodiments, on a cross-section which is perpendicular to a central axis of the motor stator, a width of the tooth crest air gap is $W_1$, $$0.15*W_T \leq W_1 \leq 0.3*W_T;$$

$$W_T = \frac{D_S * \pi}{N_S},$$

wherein $D_S$ is an outer diameter of the stator, and $N_S$ is the number of a plurality of slots of the stator.

In some embodiments, on a cross-section which is perpendicular to a central axis of the motor stator, a length of the tooth crest air gap is $L_1$, $$0.2*L_T \leq L_1 \leq 0.4*L_T;$$

$$L_T = \frac{D_S - D_Y}{2}$$

wherein $D_S$ is an outer diameter of the stator, and $D_Y$ is a bottom diameter of the slot of the stator.

Optionally, the tooth crest is made of an oriented silicon steel sheet.

According to another aspect of the present disclosure, a motor is provided, including a motor stator, where the motor stator is the forgoing motor stator.

According to a further aspect of the present disclosure, a bus is provided, including the foregoing motor stator.

The motor stator provided by the present disclosure includes the stator tooth; the stator tooth includes the tooth root and the tooth crest; the tooth crest is provided on the tooth root; the tooth crest includes the first tooth crest part and the second tooth crest part; the first tooth crest part and the second tooth crest part are provided on two sides of the tooth root along the circumference of the motor stator, respectively, and the tooth crest air gap is formed between the first tooth crest part and the second tooth crest part. For the motor stator in the present disclosure, the tooth crest of the stator tooth is treated, such that the tooth crest is divided into the first tooth crest part and the second tooth crest part, and that the first tooth crest part and the second tooth crest part form the tooth crest air gap there-between. Since the magnetic resistance of the tooth crest air gap is far greater than that of a stator core, the magnetic field generated by a permanent magnet on a rotor bypasses the tooth crest air gap when passing a stator tooth, and returns to the permanent magnet via a stator yoke portion, forming a closed circuit. This means, the magnetic flux leakage to be closed by a magnetic flux leakage path is changed into the main magnetic flux to be closed by a main magnetic flux path, fulfilling the purposes of reducing magnetic flux leakage and enhancing the utilization rate of the permanent magnet and the output torque. Moreover, the present disclosure lowers the saturation degree of the tooth crest of the stator tooth, and enhances the working performance of the motor.

DETAILED DESCRIPTION OF THE INVENTION

Definitions of some terms in the present disclosure:

Near-polar-slot permanent magnet synchronous motor: a permanent magnet motor of which the number of stator teeth is similar to the number of rotor poles ($N_S=2p\pm 1$; $N_S 2p\pm 2$, $N_S$ is the number of teeth, and p is the number of pole pairs), wherein the tooth crest width of the stator tooth is similar to the width of a polar arc.

Magnetic flux leakage: referring to a magnetic field in the motor closed, but not pass through the main magnetic flux path, will not generate effective torque but result in a part of a core where the magnetic flux leakage passes becoming saturated.

Main magnetic flux path: a magnetic field generated by a permanent magnet of a rotor passes an air gap, a stator tooth portion, a stator yoke portion, a stator tooth portion and an air gap, and then returns to the rotor and closes. The aforementioned magnetic channel is the main magnetic flux path, and is a path of magnetic field closing in the normal operating state of the motor.

Magnetic flux leakage path: a magnetic flux path to which a magnetic field does not pass the main magnetic flux path, but directly closes.

Refer to FIG. 2 to FIG. 16. According to some embodiments of the present disclosure, a motor stator includes a stator tooth 1; the stator tooth 1 includes a tooth root 2 and a tooth crest 3; the tooth crest 3 is provided on the tooth root 2; the tooth crest 3 includes a first tooth crest part 4 and a second tooth crest part 5; the first tooth crest part 4 and the second tooth crest part 5 are provided on two sides of the tooth root 2 along the circumference of the motor stator, respectively, and a tooth crest air gap 6 is formed between the first tooth crest part 4 and the second tooth crest part 5. The tooth crest air gap 6 forms an air gap between the first tooth crest part 4 and the second tooth crest part 5 and is adapt to separate at least part of the first tooth crest part 4 and the second tooth crest part 5.

For the motor stator in the present disclosure, the tooth crest 3 of the stator tooth 1 is treated, such that the tooth crest 3 is divided into the first tooth crest part 4 and the second tooth crest part 5, and that the first tooth crest part 4 and the second tooth crest part 5 form the tooth crest air gap 6 there-between. Since the magnetic resistance of the tooth crest air gap 6 is far greater than that of a stator core, the magnetic field generated by a permanent magnet on a rotor bypasses the tooth crest air gap 6 when passing a stator tooth 1, and returns to the permanent magnet via a stator yoke portion, forming a closed circuit. This means, the magnetic flux leakage to be closed by a magnetic flux leakage path is changed into the main magnetic flux to be closed by a main magnetic flux path, fulfilling the purposes of reducing magnetic flux leakage and enhancing the utilization rate of the permanent magnet and the output torque. Moreover, the present disclosure lowers the saturation degree of the tooth crest of the stator tooth, and enhances the working performance of the motor.

The foregoing motor stator is for example a stator of a near-polar-slot permanently magnetic synchronous motor. According to the present disclosure, the tooth crest of the stator of the near-polar-slot permanent magnet synchronous motor is halved such that each of the stator teeth has two smaller tooth crest parts. Decreasing the width of the tooth crest is equal to increasing the tangential (magnetic flux leakage direction) magnetic resistance of the tooth crest, while increasing the magnetic resistance is adapted to effectively bring a decline in the magnetic flux leakage to this part. In addition, the tooth crest air gap 6 is designed between the two tooth crest parts, and the magnetic resistance of the tooth crest air gap 6 is higher, so as to lead a smaller magnetic flux leakage at the tooth crest furtherly.

Figure 3:
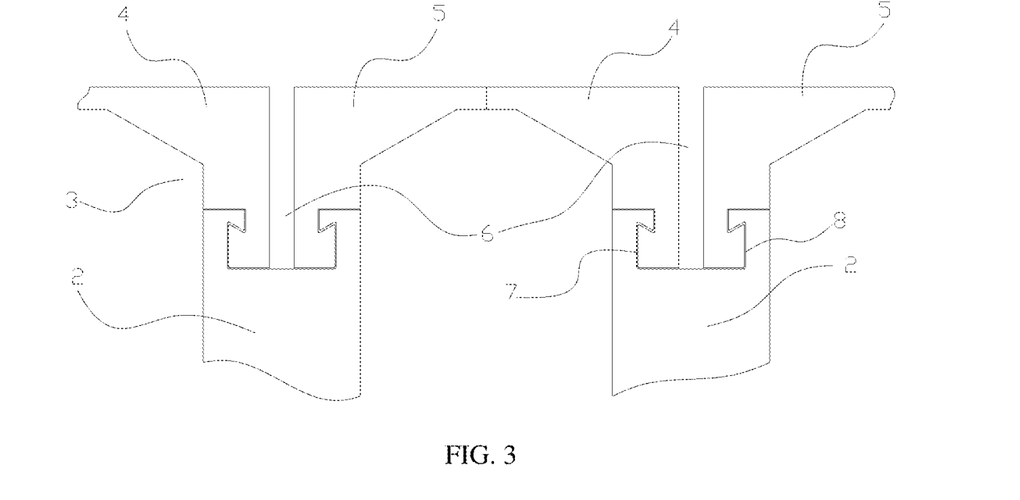
FIG. 3 is a structural view of a tooth portion of a motor stator according to some embodiments of the present disclosure.
Figure 4:
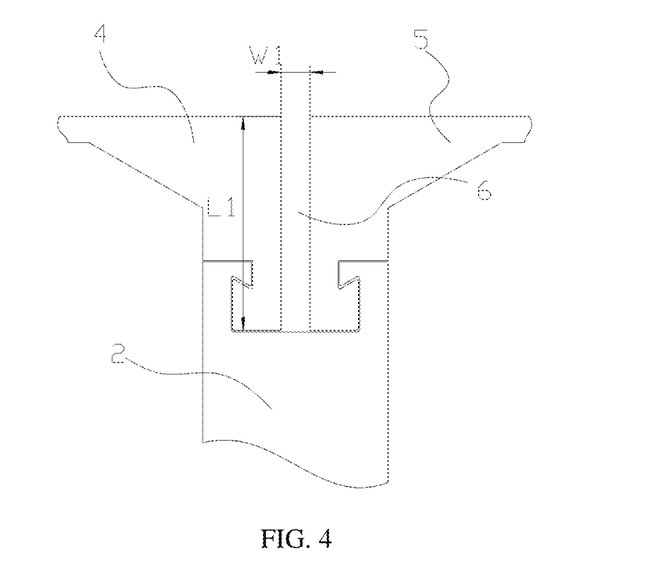
FIG. 4 is a structurally dimensional view of the tooth portion of the motor stator according to some embodiments of the present disclosure.

According to one embodiment, the tooth crest air gap 6 radially penetrates through the first tooth crest part 4 and the second tooth crest part 5 and separates the first tooth crest part 4 from the second tooth crest part 5, as shown in FIG. 3 and FIG. 4. According to the present embodiment, the first tooth crest part 4 and the second tooth crest part 5 are completely separated by the tooth crest air gap 6; the tooth crest air gap 6 is adopted to entirely block the magnetic flux leakage at the tooth crest, further to enhance the utilization rate of the permanent magnet and the output torque.

Figure 6:
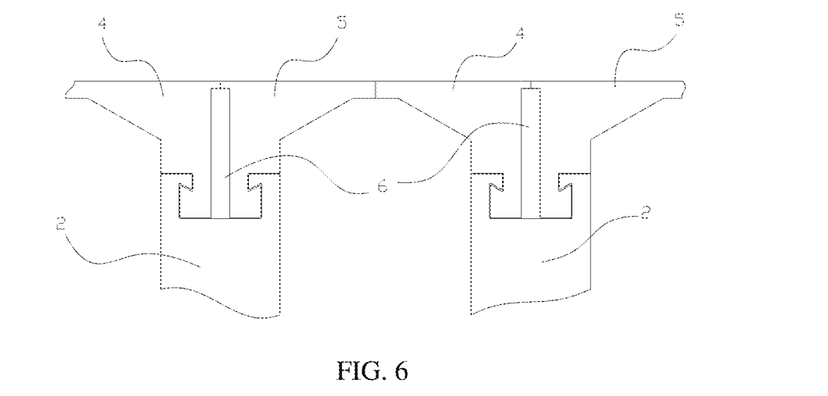
FIG. 6 is a structural view of jointing treatment on a tooth crest of a stator tooth and jointing treatment on the tooth crests of adjacent stator teeth of the motor stator according to some embodiments of the present disclosure.
Figure 7:
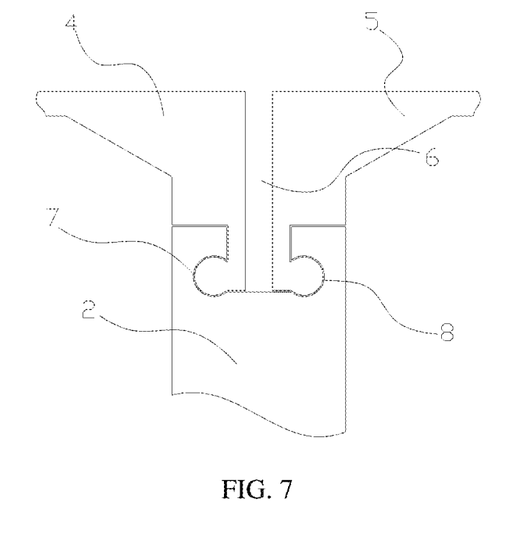
FIG. 7 is a schematic view of another mating structure of the tooth crest of the stator tooth of the motor stator according to some embodiments of the present disclosure.
Figure 8:
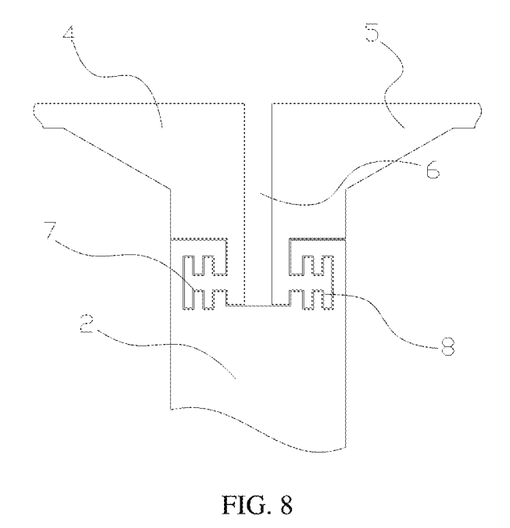
FIG. 8 is a schematic view of another mating structure of the tooth crest of the stator tooth of the motor stator according to some embodiments of the present disclosure.
Figure 9:
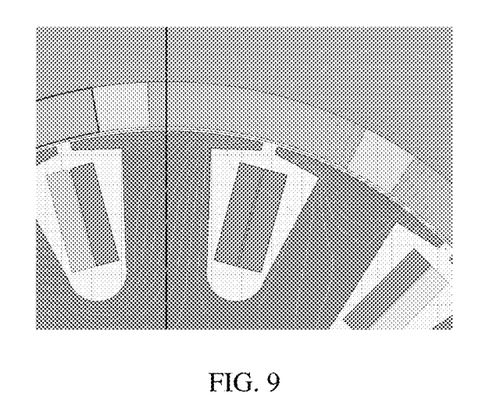
FIG. 9 is a magnetic flux path diagram of a near-polar-slot permanent magnet synchronous motor in related art.
Figure 10:
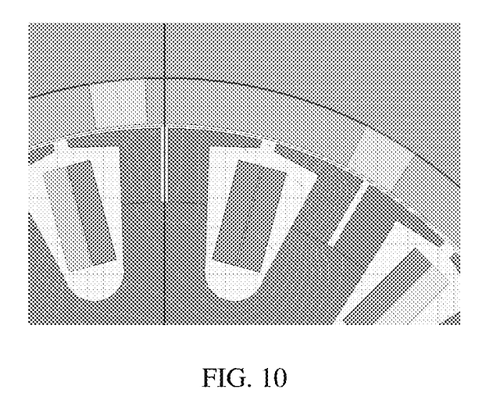
FIG. 10 is a magnetic flux path diagram of a motor according to some embodiments of the present disclosure.
Figure 11:
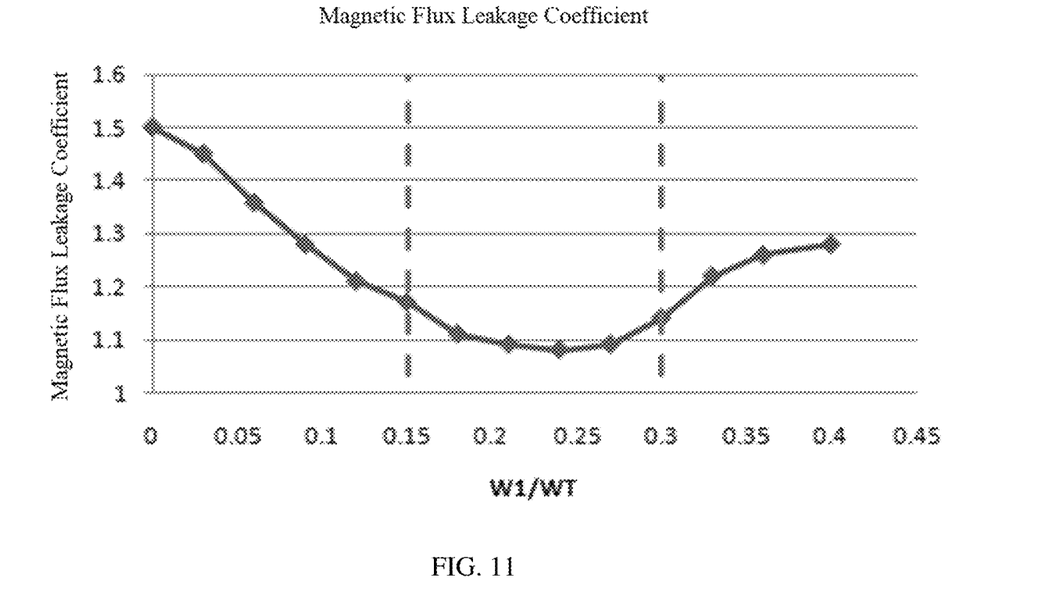
FIG. 11 is a curve graph of influences of a tooth crest dimension $W_1$ on the magnetic flux leakage coefficient of the motor.
Figure 12:
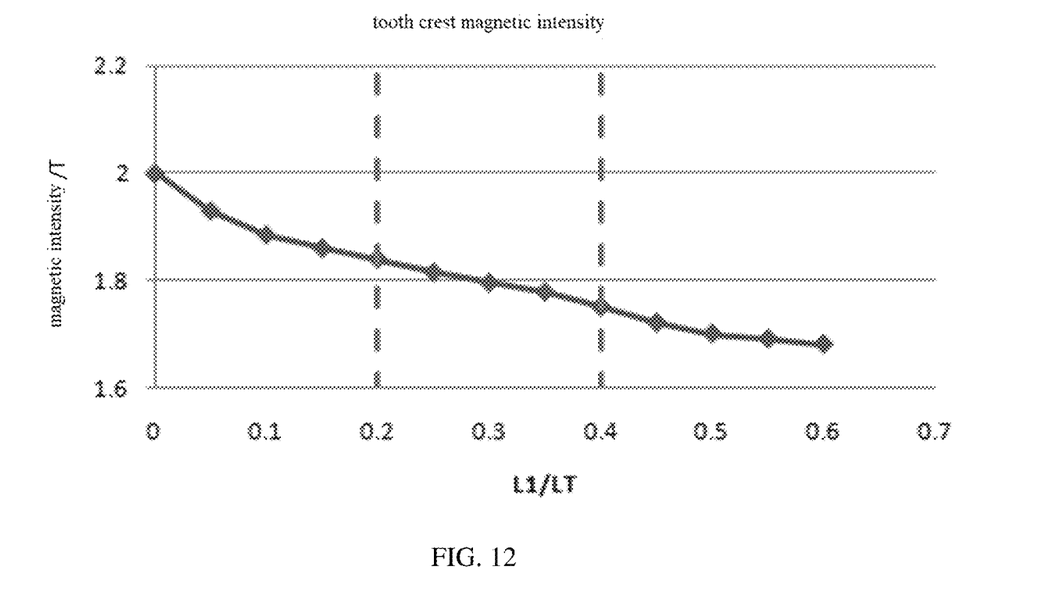
FIG. 12 is a curve graph of influences of a tooth crest dimension $L_1$ on the tooth crest magnetic intensity.

According to another embodiment, the tooth crest air gap 6 radially extends from ends, close to the tooth root 2, of the first tooth crest part 4 and the second tooth crest part 5, and the first tooth crest part 4 and the second tooth crest part 5 abut at ends away from the tooth root 2, so as to close the tooth crest air gap 6, as shown in FIG. 6. According to the present embodiment, the top portion of the first tooth crest part 4 extends to form a protrusion towards the second tooth crest part 5; the top portion of the second tooth crest part 5 extends to form a protrusion towards the first tooth crest part 4; the two protrusions abut to close a top opening of the tooth crest air gap 6, so as to form a closed tooth crest air gap 6. In such structure, one part, close to an air gap between the stator and the rotor, of the tooth crest 3 is jointed. Therefore, the stator surface achieves a surface without slot opening, thereby resulting in smoother change of the magnetic resistance at the air gap between the rotor and the stator and bringing a smaller torque pulsation.

Optionally, the first tooth crest part 4 and the second tooth crest part 5 are integrally molded to generate higher structure performance. The first tooth crest part 4 and the second tooth crest part 5 are also suitable for fixedly connecting as a whole by means of splicing.

Figure 5:
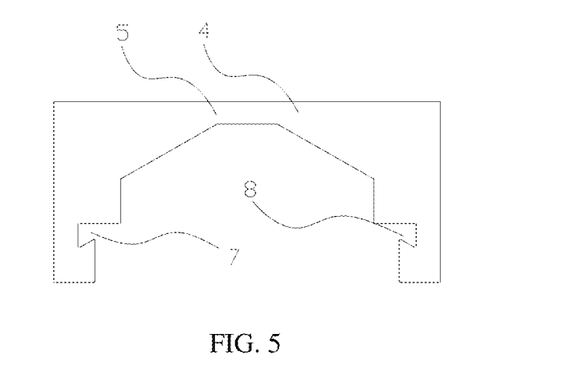
FIG. 5 is a structural view of jointing treatment on tooth crests of adjacent stator teeth of the motor stator according to some embodiments of the present disclosure.
Figure 13:
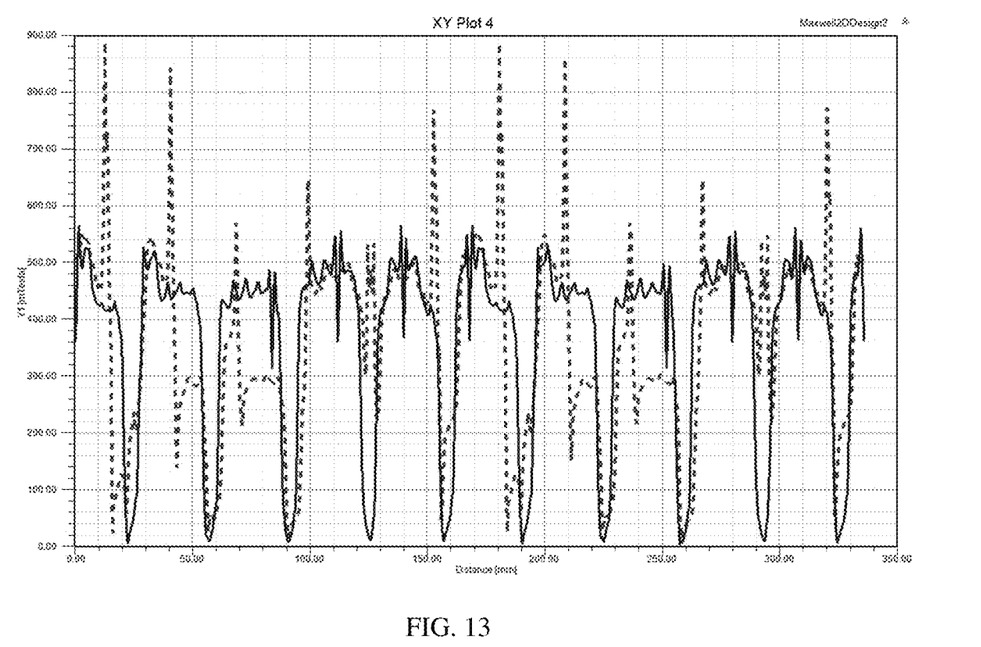
FIG. 13 is a comparison diagram of magnetic intensity waveforms at air gaps of a conventional near-polar-slot motor and the motor according to the present disclosure.
Figure 14:
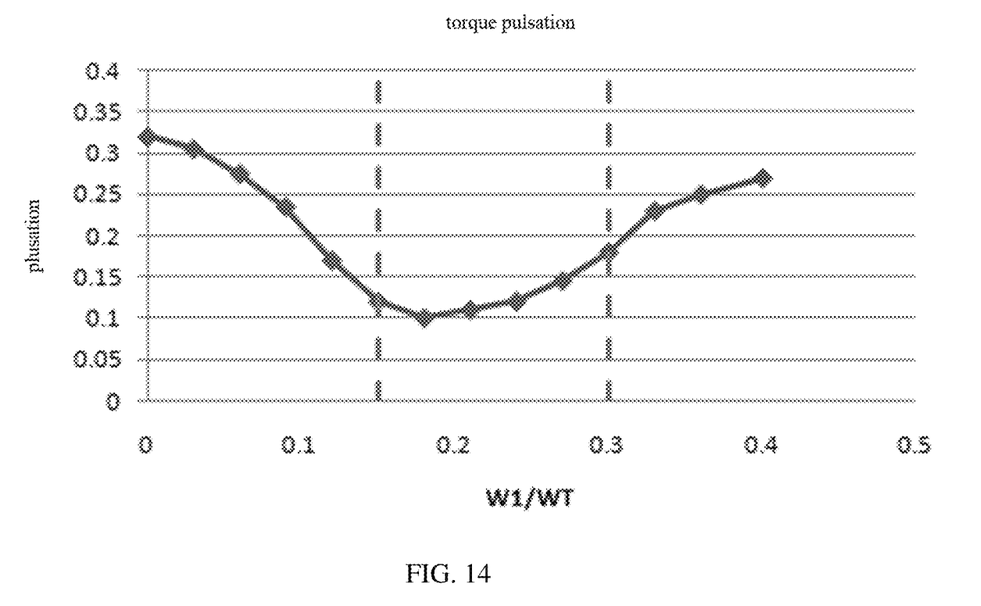
FIG. 14 is a curve graph of influences of a tooth crest dimension $W_1$ on the torque pulsation.
Figure 15:
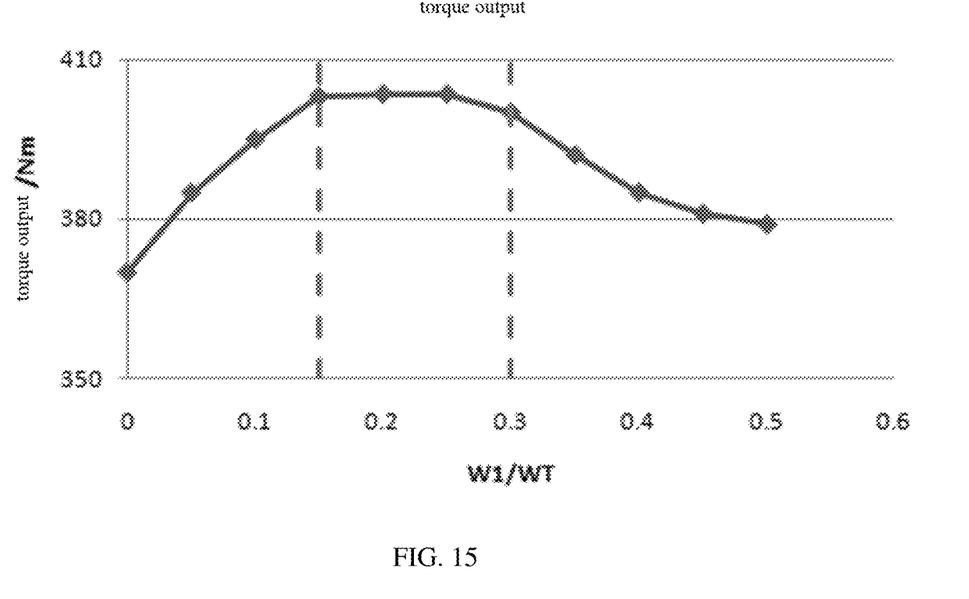
FIG. 15 is a curve graph of influences of a tooth crest dimension $W_1$ on the torque output; and, FIG. 16 is a curve graph of influences of a tooth crest dimension $L_1$ on the torque output.
Figure 16:
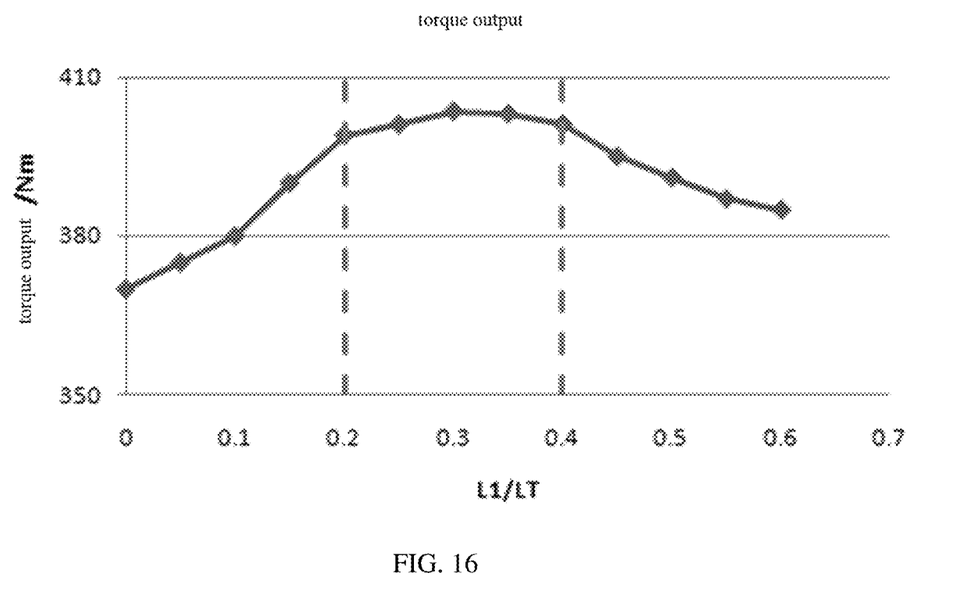

According to one embodiment of the present disclosure, the first tooth crest part 4 of the stator tooth 1 abuts the second tooth crest part 5 of an adjoining stator tooth 1 to form a closed slot, as shown in FIG. 5 and FIG. 6. According to the present embodiment, the tops of two half stator teeth between two adjacent stator teeth 1 are jointed, which means that the first tooth crest part 4 of one stator tooth 1 is jointed with the second tooth crest part 5 of the other stator tooth 1, thereby forming a combined tooth crest part of stator. The combined tooth crest part of stator is in a fastened connection with the tooth root 2 by snap-fit to form the stator tooth crest of a near-polar-slot permanently magnetic synchronous motor. The jointed stator tooth crest seals the slot opening of the stator to form a closed slot. In addition, the connection by snap-fit allows the operation of inserting a coil first and then sealing off the tooth crest for the motor, thereby resolving the problem that it is difficult to insert a coil in the closed slot. The stator undergoing the jointing treatment has the closed slot, and combining with the halving treatment decreases the saturation degree of the tooth crest of the stator, such that the magnetic resistance at the air gap between the stator and the rotor changes smoothly, thereby optimizing the magnetic intensity waveform at the air gap and obviously reducing the torque pulse, as shown in FIG. 13.

Optionally, the first tooth crest part 4 of the stator tooth 1 and the second tooth crest part 5 of an adjoining stator tooth 1 are integrally molded.

Optionally, the first tooth crest part 4 and the second tooth crest part 5 are in a clamped fixation with the tooth root 2, the fitting difficulty of the first tooth crest part 4 and the second tooth crest part 5 with the tooth root 2 is reduced, and the processing cost is reduced.

According to the present embodiment, the tooth root 2 is provided with a first clamping slot 7 which extends along an axis direction of the motor stator, and the first tooth crest part 4 is clamped in the first clamping slot 7; and/or, the tooth root 2 is provided with a second clamping slot 8 which extends along the axis direction of the motor stator, and the second tooth crest part 5 is clamped in the second clamping slot 8. The first clamping slot 7 and the second clamping slot 8 have the same structure to improve the structural symmetry between the first tooth crest part 4 and the second tooth crest part 5.

According to the present embodiment, the first tooth crest part 4 and the second tooth crest part 5 on the tooth root 2 are symmetrically arranged with regard to the axial plane of the tooth root 2, and the first clamping slot 7 and the second clamping slot 8 are also symmetric to the plane, thereby reducing the processing difficulty and cost of the first tooth crest part 4 and the second tooth crest part 5, reducing the number of molds, and lowering the cost of mold opening.

Optionally, the cross section of the first clamping slot 7 and/or the second clamping slot 8 is trapezoidal, ±-shaped or major arc shaped. Optionally, the cross section of the first clamping slot 7 and/or the second clamping slot 8 is of another shape, for example a dovetail or sector shape.

On a cross-section which is perpendicular to the central axis of the motor stator, a width of the tooth crest air gap 6 is $W_1$, $$0.15*W_T \leq W_1 \leq 0.3*W_T;$$

$$W_T = \frac{D_S * \pi}{N_S}$$

wherein $D_S$ is an outer diameter of the stator, and $N_S$ is the number of slots of the stator.

On a cross-section which is perpendicular to the central axis of the motor stator, a length of the tooth crest air gap 6 is $L_1$, $$0.2*L_T \leq L_1 \leq 0.4*L_T;$$

$$L_T = \frac{D_S - D_Y}{2}$$

wherein $D_S$ is the outer diameter of the stator, and $D_Y$ is a bottom diameter of the slot of the stator.

When at least one of $W_1$ and $L_1$ meets the foregoing conditions, various torque properties of the motor will be improved.

The tooth crest 3 is made of oriented silicon steel sheets.

There are two advantages caused by utilizing the oriented silicon steel sheet.

Figure 2:
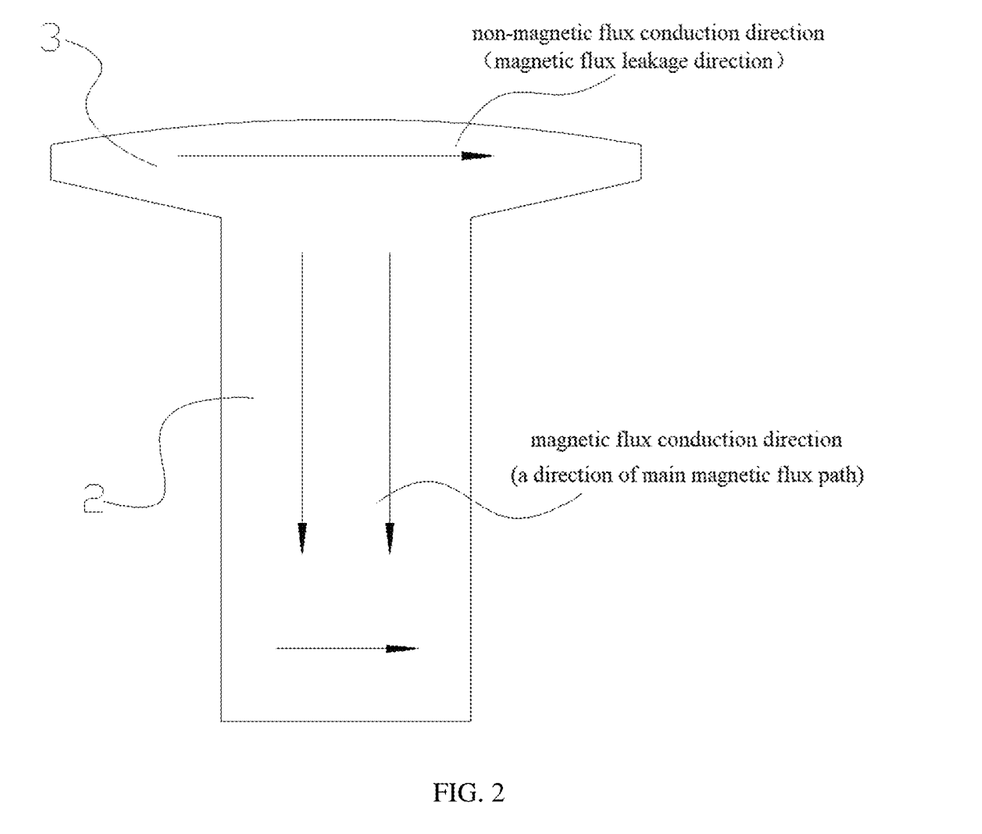
FIG. 2 is a schematic view of magnetic flux conduction of an oriented silicon steel sheet.

1. Since magnetic flux conduction works in only one direction, the main magnetic flux path direction and the magnetic flux conduction direction of the oriented silicon steel sheet are the same, while the magnetic flux leakage direction is orthogonal to the magnetic flux conduction direction of the oriented silicon steel sheet, as shown in FIG. 2, and in conjunction with the halved stator teeth, a significant effect of reducing magnetic flux leakage is achieved.

2. The oriented silicon steel sheet is superior to conventional non-oriented silicon steel sheets in the magnetic flux conduction capability, and such feature greatly decreases the saturation degree of the tooth crest 3 of the stator tooth 1, so as to make the change of the magnetic resistance at the air gap between the stator and the rotor smoother and further decrease the torque pulsation.

According to an embodiment of the present disclosure, the motor includes a motor stator, and the motor stator is the forgoing motor stator. The motor stator is optionally a stator of a near-polar-slot permanently magnetic synchronous motor.

According to an embodiment of the present disclosure, a bus includes the forgoing motor stator.

It is easy for one skilled in the art to understand that, without conflicts, the foregoing preferred embodiments can be freely combined and superimposed.

The above describes merely preferable embodiments of the present disclosure and shall not limit the present disclosure. Any modifications, equivalent substitutions, improvements and the like made within the spirit and principle of the present disclosure shall fall within the protective scope of the present disclosure. The above describes merely preferred embodiments of the present disclosure. It should be noted that, within the technical concept of the present disclosure, one ordinarily skilled in the art can make various improvements and modifications, which shall all fall within the protective scope of the present disclosure.

The invention claimed is:

1. A motor stator, comprising a stator tooth, wherein the stator tooth comprises a tooth root and a tooth crest; the tooth crest is provided on the tooth root; the tooth crest comprises a first tooth crest part and a second tooth crest part; the first tooth crest part and the second tooth crest part are provided on two sides of the tooth root along the circumference of the motor stator, respectively, and a tooth crest air gap is formed between the first tooth crest part and the second tooth crest part;

the tooth crest air gap radially penetrates through the first tooth crest part and the second tooth crest part, and separates the first tooth crest part from the second tooth crest part;

the first tooth crest part and the second tooth crest part are completely separated by the tooth crest air gap, and the first tooth crest part and the second tooth crest part are two completely independent components;

wherein the first tooth crest part and the second tooth crest part are in a clamped fixation with the tooth root respectively.

2. The motor stator according to claim 1, wherein the tooth crest air gap radially extends from a plurality of ends, close to the tooth root, of the first tooth crest part and the second tooth crest part, and the first tooth crest part and the second tooth crest part abut at a plurality of ends away from the tooth root, so as to close the tooth crest air gap.

3. The motor stator according to claim 2, wherein the first tooth crest part and the second tooth crest part are integrally molded.

4. The motor stator according to claim 1, wherein the first tooth crest part of the stator tooth abuts the second tooth crest part of an adjoining stator tooth to form a closed slot.

5. The motor stator according to claim 4, wherein the first tooth crest part of the stator tooth and the second tooth crest part of the adjoining stator tooth are integrally molded.

6. The motor stator according to claim 1, wherein the tooth root is provided with a first clamping slot which extends along an axis direction of the motor stator, and the first tooth crest part is clamped in the first clamping slot; and/or, the tooth root is provided with a second clamping slot which extends along the axis direction of the motor stator, and the second tooth crest part is clamped in the second clamping slot.

7. The motor stator according to claim 6, wherein the cross section of the first clamping slot and/or the second clamping slot is trapezoidal, shaped or major arc shaped.

8. The motor stator according to claim 1, wherein on a cross-section which is perpendicular to a central axis of the motor stator, a width of the tooth crest air gap is $W_1$, $$0.15*W_T \leq W_1 \leq 0.3*W_T;$$

$$W_T = \frac{D_S * \pi}{N_S},$$

wherein $D_S$ is an outer diameter of the stator, and $N_S$ is a number of a plurality of slots of the stator.

9. The motor stator according to claim 1, wherein on a cross-section which is perpendicular to a central axis of the motor stator, a length of the tooth crest air gap is $L_1$, $$0.2*L_T \leq L_1 \leq 0.4*L_T;$$

$$L_T = \frac{D_S - D_Y}{2}.$$

wherein $D_S$ is the outer diameter of the stator, and $D_Y$ is a bottom diameter of the slot of the stator.

10. The motor stator according to claim 1, wherein the tooth crest is made of a plurality of oriented silicon steel sheets.

11. A motor, comprising a motor stator, including a stator tooth, wherein the stator tooth comprises a tooth root and a tooth crest; the tooth crest is provided on the tooth root; the tooth crest comprises a first tooth crest part and a second tooth crest part; the first tooth crest part and the second tooth crest part are provided on two sides of the tooth root along the circumference of the motor stator, respectively, and a tooth crest air gap is formed between the first tooth crest part and the second tooth crest part;

the tooth crest air gap radially penetrates through the first tooth crest part and the second tooth crest pat, and separates the first tooth crest pail from the second tooth crest part; the first tooth crest part and the second tooth crest par are completely separated by the tooth crest air gap, and the first tooth crest part and the second tooth crest part are two completely independent components, wherein the first tooth crest part and the second tooth crest part are in a clamped fixation with the tooth root respectively.

12. A bus, comprising a motor including a motor stator, comprising a stator tooth, wherein the stator tooth comprises a tooth root and a tooth crest; the tooth crest is provided on the tooth root; the tooth crest comprises a first tooth crest part and a second tooth crest part; the first tooth crest part and the second tooth crest part are provided on two sides of the tooth root along the circumference of the motor stator, respectively, and a tooth crest air gap is formed between the first tooth crest part and the second tooth crest part;

the tooth crest air gap radially penetrates through the first tooth crest part and the second tooth crest part, and separates the first tooth crest par from the second tooth crest part; the first tooth crest part and the second tooth crest part are completely separated by the tooth crest air gap, and the first tooth crest part and the second tooth crest part are two completely independent components;

wherein the first tooth crest part and the second tooth crest part are in a clamped fixation with the tooth root respectively.

\* \* \* \* \*

UNITED STATES PATENT AND TRADEMARK OFFICE
CERTIFICATE OF CORRECTION

PATENT NO. : 11,575,290 B2
APPLICATION NO. : 17/054799
DATED : February 7, 2023
INVENTOR(S) : Keliang Liao et al.

It is certified that error appears in the above-identified patent and that said Letters Patent is hereby corrected as shown below:

In the Claims

Column 7, Line 20, Claim 7, delete "shaped" and insert -- ±-shaped --

Column 8, Line 59, Claim 11, delete "pat," and insert -- part, --

Column 8, Line 60, Claim 11, delete "pail" and insert -- part --

Column 8, Line 62, Claim 11, delete "par" and insert -- part --

Column 9, Line 12, Claim 12, delete "par" and insert -- part --

Signed and Sealed this
Twenty-eighth Day of March, 2023

Katherine Kelly Vidal
*Director of the United States Patent and Trademark Office*